United States Patent [19]

Smith

[11] Patent Number: 4,955,209

[45] Date of Patent: Sep. 11, 1990

[54] CRYOGENIC BATH FREEZER WITH PIVOTED CONVEYOR BELT

[75] Inventor: Bryan K. Smith, Huntington Beach, Calif.

[73] Assignee: Cryo-Chem Inc., Carson, Calif.

[21] Appl. No.: 430,005

[22] Filed: Nov. 1, 1989

[51] Int. Cl.⁵ .............................................. F25D 25/04
[52] U.S. Cl. .......................................... 62/380; 62/63; 62/374; 134/135
[58] Field of Search .................... 134/135; 62/63, 266, 62/303, 374, 380

[56] References Cited

U.S. PATENT DOCUMENTS

| | | | |
|---|---|---|---|
| 2,968,568 | 1/1961 | Preuss | 62/380 |
| 3,096,627 | 7/1963 | Morrison | 62/380 |
| 3,283,523 | 11/1966 | Long | 62/374 |
| 3,664,146 | 5/1972 | Butts | 62/374 |
| 3,757,533 | 9/1973 | Kent | 62/374 |
| 3,832,864 | 9/1974 | Rasovich | 62/374 |
| 4,361,016 | 11/1982 | Multack | 62/374 |
| 4,403,479 | 9/1983 | Rasovich | 62/63 |
| 4,414,823 | 11/1983 | McWhorter | 62/266 |
| 4,481,782 | 11/1984 | Mukerjee | 62/63 |
| 4,539,824 | 9/1985 | Kuraoka et al. | 62/380 |
| 4,555,914 | 12/1985 | Kanto et al. | 62/380 |
| 4,627,244 | 12/1986 | Willhoft | 62/63 |
| 4,745,762 | 5/1988 | Taylor | 62/63 |
| 4,757,691 | 7/1988 | Compagnon | 62/63 |
| 4,777,733 | 10/1988 | Usuiwa et al. | 34/20 |
| 4,782,668 | 11/1988 | Stokes | 62/380 |
| 4,783,972 | 11/1988 | Tyree, Jr. et al. | 62/374 |

Primary Examiner—Ronald C. Capossela
Attorney, Agent, or Firm—Dennison, Meserole, Pollack & Scheiner

[57] ABSTRACT

A cryogenic freezer having an insulated cabinet forming an interior vessel with a bottom and sloping sides. A shallow liquid nitrogen bath is maintained in the vessel at a predetermined level. A conveyor assembly having a medial portion shaped to conform to the profile of the vessel is pivotally mounted at one end so that the medial portion is submerged in liquid nitrogen. An endless conveyor belt is mounted on the conveyor assembly by means of support rollers and guides to maintain a tensioned relationship. A jack is provided on the conveyor assembly to rotate the assembly about its pivot. An exhaust system is connected to the cabinet to remove evolved nitrogen gas.

18 Claims, 7 Drawing Sheets

CRYOGENIC BATH FREEZER WITH PIVOTED CONVEYOR BELT

BACKGROUND OF THE INVENTION

This invention relates to an apparatus for the cryogenic freezing of products on an automated batch basis. It is particularly useful for the fast freezing of food items to promote preservation while at the same time sealing in the original flavor, texture and appearance. In general, it has been determined that for most foods, better quality results from a shorter freezing time.

The use of cryogenic fluids such as nitrogen and carbon dioxide has become quite common for rapidly freezing foods. Liquid nitrogen, for example, boils at $-320°$ F. at atmospheric pressure and is completely inert with respect to the food it contacts.

A number of cryogenic freezing machines have been invented as typified by U.S. Pat. No. 3,832,864, issued Sept. 3, 1974 to Ivan Rasovich; U.S. Pat. No. 4,481,782, issued Nov. 13, 1984 to Ajit K. Mukerjee and U.S. Pat. No. 4,783,972, issued Nov. 15, 1988 to Lewis Tyree, Jr. et al.

The patent to Rasovich shows an insulated cabinet containing a cold bath of cryogenic fluid maintained at a predetermined level. A slack conveyor belt having a pair of endless chains is arranged to droop within the bath between two supporting sprockets. One of the sprockets is driven by a motor. Items to be frozen are placed on the conveyor belt at a loading end and are carried through the cold bath to be frozen and deposited at an exiting end. The arrangement disclosed in Rasovich is generally referred to in the art as a "liquid immersion system."

The patent to Mukerjee shows a freezing tunnel apparatus wherein an endless conveyor belt is arranged to operate within an insulated elongated chamber having an open entrance and exit. Items to be frozen are placed on the conveyor belt and subjected to a spray of liquid carbon dioxide which sublimates into a cold, dense, carbon dioxide vapor. The vapor is circulated above and below the conveyor by means of a number of circulating fans. The product load gradually freezes as it travels through the tunnel while subjected to a blast of cold carbon dioxide vapor. The arrangement disclosed in Mukerjee is generally referred to in the art as a "freezing tunnel."

The patent to Tyree et al shows a combination liquid immersion and freezing tunnel system having a thermally insulated tunnel enclosure with an entrance and an exit and an endless conveyor belt for carrying products to be frozen through the tunnel. The conveyor belt passes through a liquid immersion bath near the entrance and then proceeds through a freezing tunnel to deposit frozen products at the exit. The cold vapor released in the immersion bath by the initial cooling is circulated through the freezing tunnel by means of a number of fans and baffles to complete the freezing process. The arrangement disclosed in Tyree et al is generally referred to in the art as a "combination liquid immersion and freezing tunnel system."

Of the three systems discussed above, the liquid immersion system is capable of achieving the fastest freezing rate. Both sensible and latent heat transfer from the product are far greater with liquid contact than with vapor contact. With liquid contact, the vapor formed by the change of state rises as bubbles away from the heat transfer surfaces allowing an immediate wiping contact with fresh liquid. Vapor contact, on the other hand, forms an adhering film which reduces heat transfer. Also, in products such as eviscerated chickens, cavities are present which contain stagnant vapor which can rise to much higher temperatures than the moving vapor.

Theoretically considered, freezing tunnels should have a slightly better efficiency since the vapor is allowed to expand to a superheated state before it is rejected to the atmosphere. However, this slight advantage is offset by the increased size and cost of the equipment, the increased mechanical complexity with attendant service costs, and the increased cost in cleaning the equipment after shutdown.

While the prior art does teach liquid immersion systems the prior art does not teach a liquid immersion system having the efficiency of operation, the ease of cleaning after shutdown, the compactness and reduced complexity found in the instant invention.

SUMMARY OF THE INVENTION

The overall object of the present invention is to improve upon the prior art liquid immersion systems by increasing the reliability, the efficiency, the ease of operation and the ease of cleaning.

It is a specific object of the invention to provide a conveyor belt which can be pivoted at one end to be raised out of the cryogenic bath to be exposed above the cabinet for cleaning purposes.

It is another object of the invention to provide a conveyor belt which can withstand the stress and thermal shock encountered in operating for long periods at $-320°$ F. The belt is woven from 16 swg stainless steel wire, supported by ¼ inch stainless steel rods welded to a stainless steel roller chain by which the belt is driven through the freezer. To prevent debris passing through the belt and into the bath, the mesh of the belt is "filled" with an ultra high molecular weight polyethylene insert which effectively makes the belt solid but maintains its flexibility.

It is another object of the invention to provide a conveyor of low friction design which enables high speed operation, typically to 50 feet per minute. The ability to control the residence time of the product load in the bath from long to short immersions renders the cryogenic bath freezer of this invention adaptable to a wide variety of products and freezing modes. Also, production rates can be increased thereby reducing costs.

It is another object of the invention to provide a freezer cabinet of double wall construction containing a thick layer of expanded polyurethane foam in a hermetically sealed relation to preclude the entry of moisture. The interior of the cabinet is shaped to form a shallow bath which cooperates with the mechanically supported conveyor to reduce the amount of liquid nitrogen in the bath.

It is yet another object of the invention to provide a gas extraction system which removes the evolved gases from the freezer cabinet in a controlled manner. The system also withdraws a controlled amount of air from the room housing the cabinet to prevent any excessive nitrogen buildup which can be hazardous to operating personnel.

DESCRIPTION OF THE PREFERRED EMBODIMENTS

Figure 1:
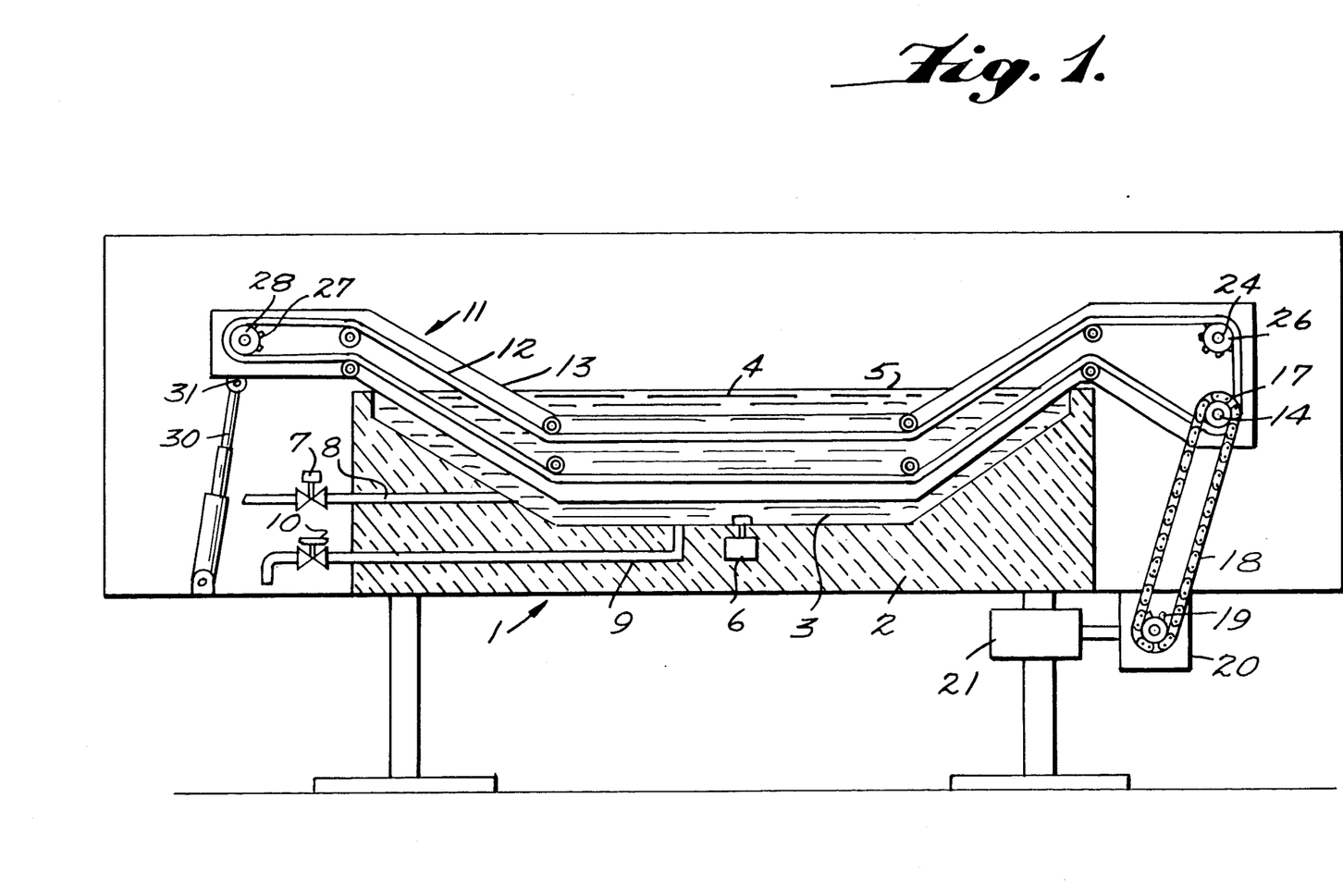
FIG. 1 is a diagrammatic explanatory view of the invention showing the conveyor belt assembly in operative position.
Figure 2:
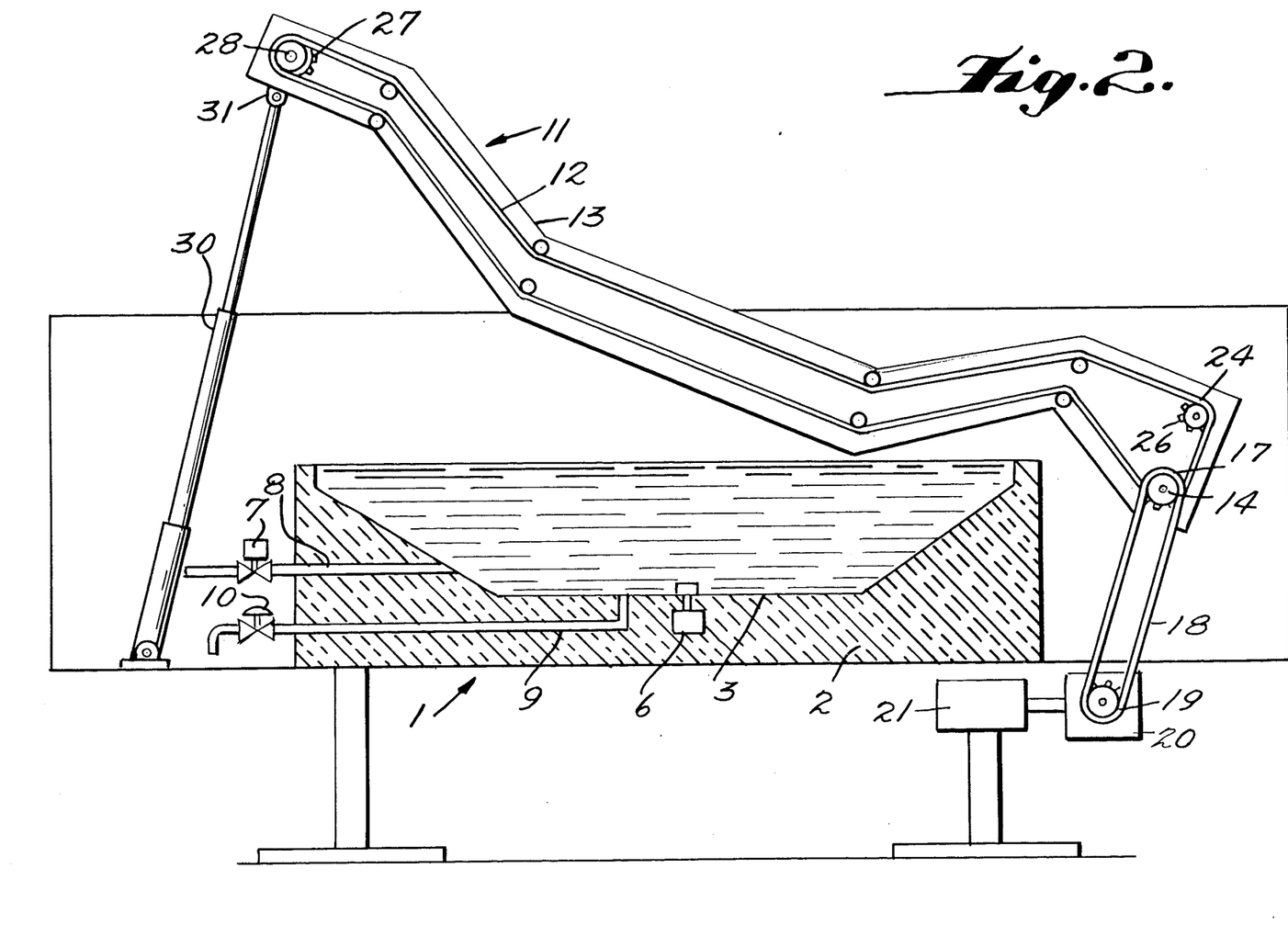
FIG. 2 is a diagrammatic explanatory view showing the conveyor belt assembly in a raised cleaning position.
Figure 3:
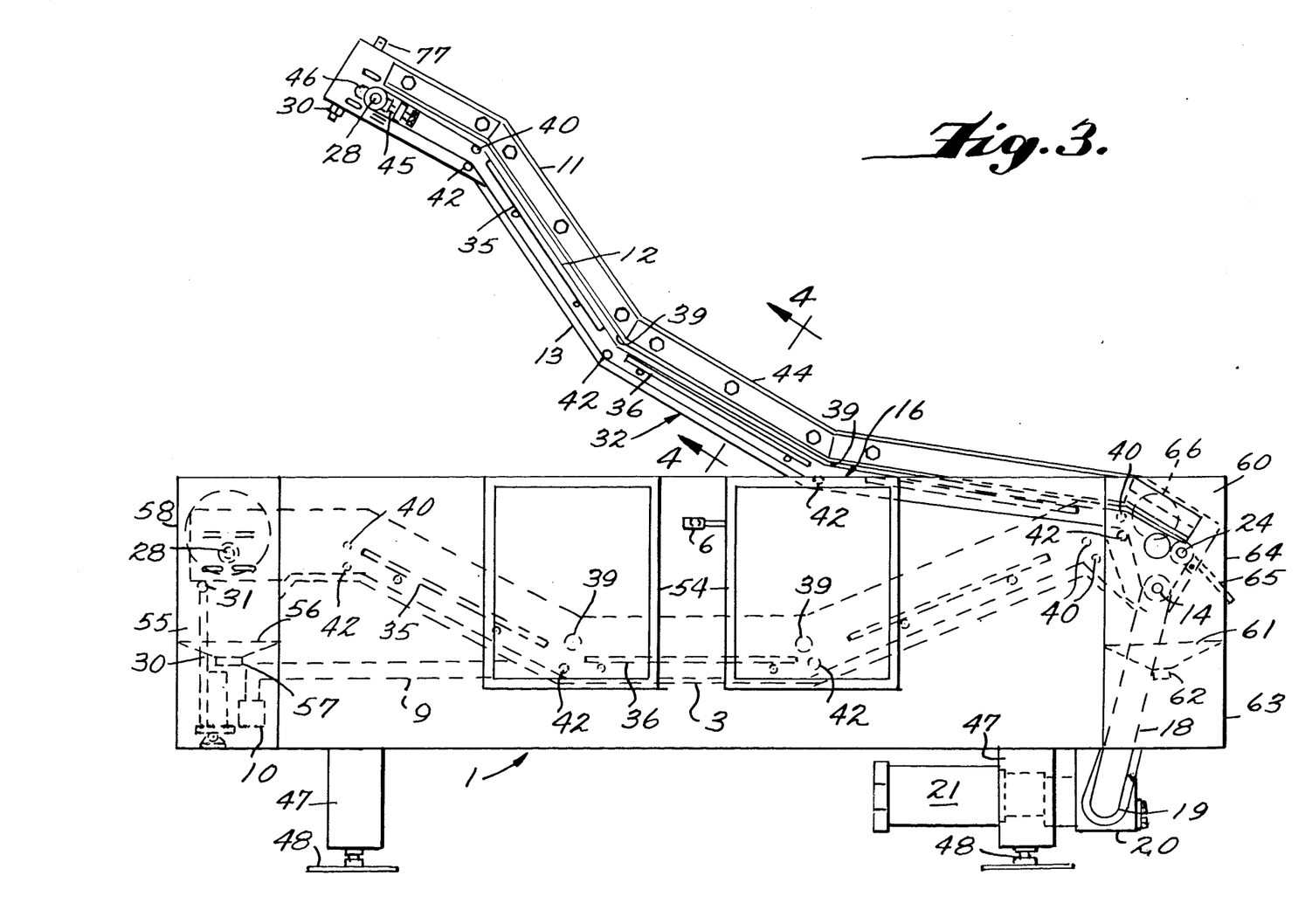
FIG. 3 is a side view of the cryogenic freezer of the invention with the conveyor belt assembly shown in raised position and in phantom in operative position.
Figure 7:
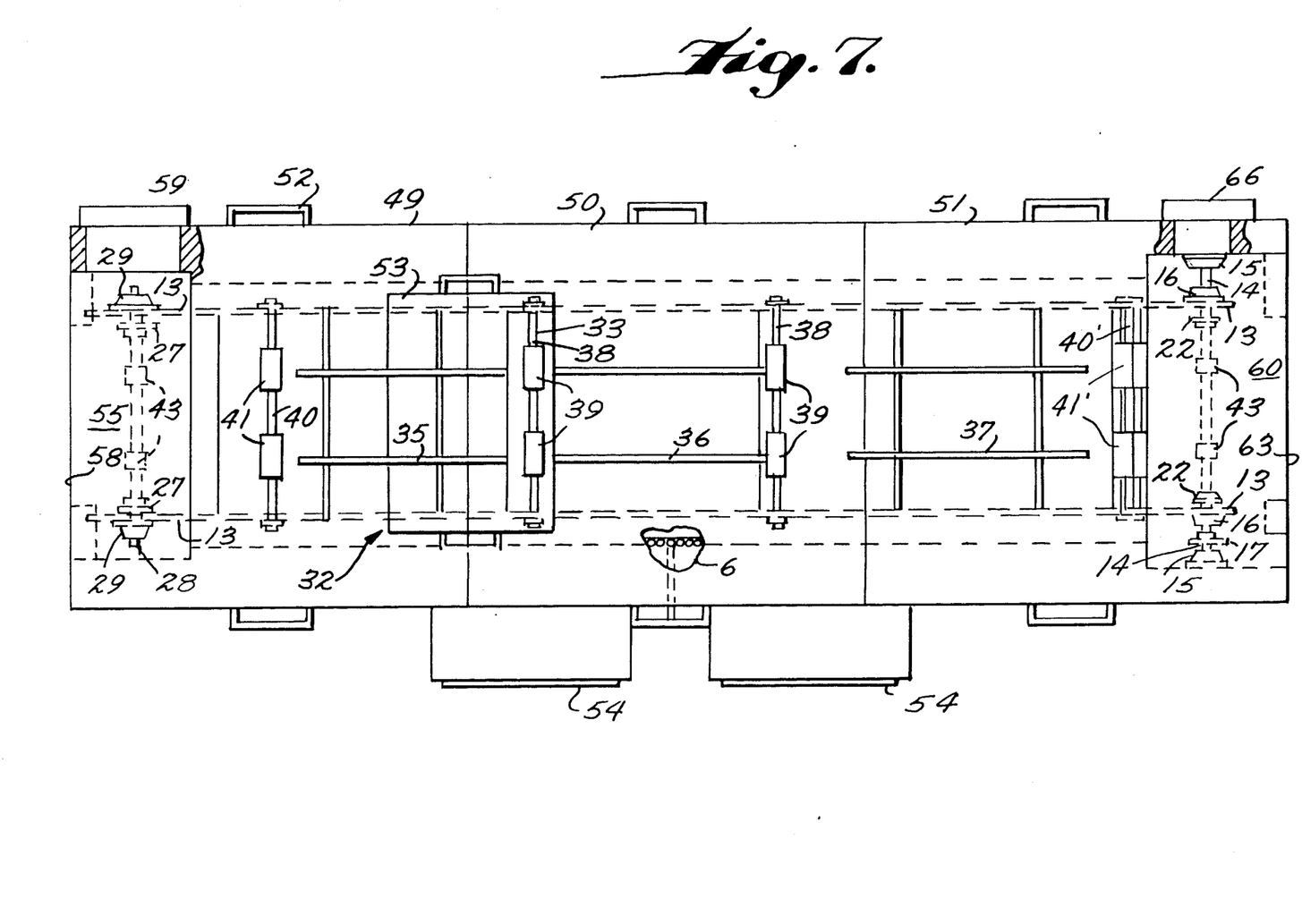
FIG. 7 is a top plan view of the system of FIG. 4 with parts omitted to show the support structure for the conveyor belt.
Figure 8:
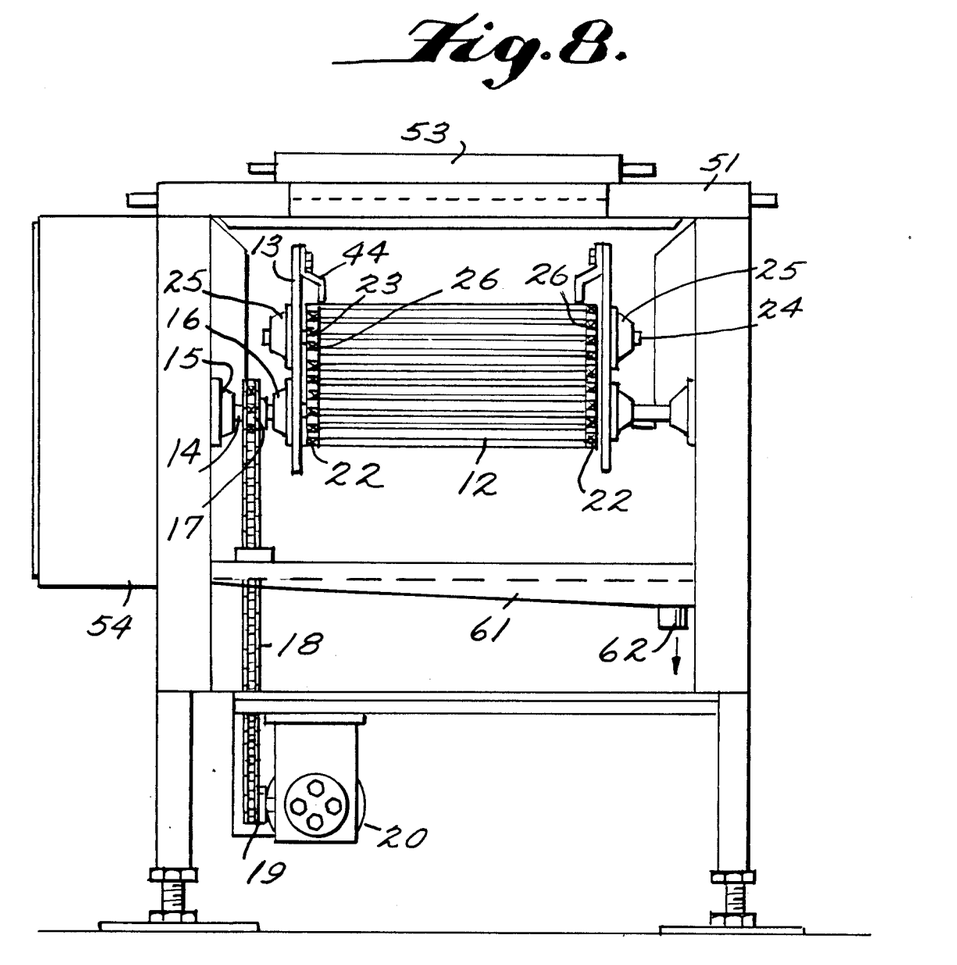
FIG. 8 is a view of the drive end of FIG. 3 with the conveyor assembly in operative position.

Referring to the explanatory views of FIGS. 1 and 2 which should be considered along with FIGS. 3, 7 and 8, the novel cryogenic freezing device of this invention comprises a cabinet 1 manufactured entirely from type 304 stainless steel. The cabinet is of double wall construction with eight inches of expanded polyurethane foam 2 hermetically sealed therein. The integrity of the construction is checked by inert gas leak detection. This ensures that no water can penetrate the foam and degrade its insulation properties throughout the lifetime of the freezer. The interior of the cabinet is shaped to form a shallow vessel 3 with sloping sides to contain a cryogenic liquid bath 4 such as liquid nitrogen which is maintained at a predetermined level 5 by means of a conventional liquid level control 6. The liquid level control 6 is wired to a nitrogen supply solenoid valve 7 which controls entry of liquid nitrogen from an external supply to a fill tube 8 discharging into bath 4. A drain 9 connected to the bottom of vessel 3 is fitted with a drain valve 10 to permit drainage of the vessel for cleaning purposes.

A conveyor belt assembly 11 carrying an endless belt conveyor 12 is pivotally mounted within the cabinet in an operative position to carry product load through the cryogenic bath 4 (FIG. 1) and in a cleaning position where it is raised out of the bath (FIG. 2). The conveyor belt assembly comprises a pair of opposed side plates 13 pivotally mounted on a shaft 14 which is rotatably supported within the cabinet 1 by means of bearings 15 (FIGS. 7 and 8). Bearings 15 are self-aligning, are retained in a stainless steel housing and are formed of a TEFLON-bronze composite material. These bearings have been proven in cryogenic service and are superior to all plastic bearings because the addition of the bronze gives increased wear life and more importantly, controls the contraction rate of the bearings and avoids seizure problems.

A pair of bearings 16 of the same construction as bearings 15 are mounted on shaft 14 and secured to side plates 13 to rotatably support the side plates on shaft 14.

A sprocket gear 17 is rigidly attached to shaft 14 and is rotated by chain drive 18 driven by output sprocket 19 of gear reducer 20 driven in turn by motor 21. A pair of conveyor belt drive sprockets 22 (FIGS. 7 and 8) are rigidly mounted on shaft 14 to support the stainless steel roller chains 23 of the endless belt conveyor 12 which will be more specifically described in connection with FIGS. 5 and 6.

A drive end idler shaft 24 (FIG. 8) is rotatably mounted on side plates 13 by means of a pair of TEFLON-bronze bearings 25 secured to the outer sides of plates 13. A pair of idler sprockets 26 are rigidly secured to shaft 24 and are spaced to receive the roller chains 23 of the belt conveyor. After passing over the idler sprockets 26 the conveyor belt 12 is guided along side plates 13 to an opposite end where it passes over a pair of sprockets 27 secured to an idler shaft 28 rotatably mounted in TEFLON-bronze bearings 29 secured to the outer sides of side plates 13.

An electrically operated screw jack 30 is pivotally mounted on the base of the cabinet at an end opposite the drive end hereinafter referred to as the load end since products to be frozen are deposited on the conveyor at this location. The end of the telescoping extensions of the screw jack is pivotally attached to a crossbar 31 which is mounted on the underside of side plates 13. When the screw jack is in its retracted position (FIG. 1) the conveyor assembly 11 is in its lowest position with most of the endless belt conveyor 12 submerged in liquid nitrogen. When the screw jack is energized the extending telescoping sections raise the conveyor assembly around shaft 14 elevating it out of the nitrogen bath.

Figure 5:
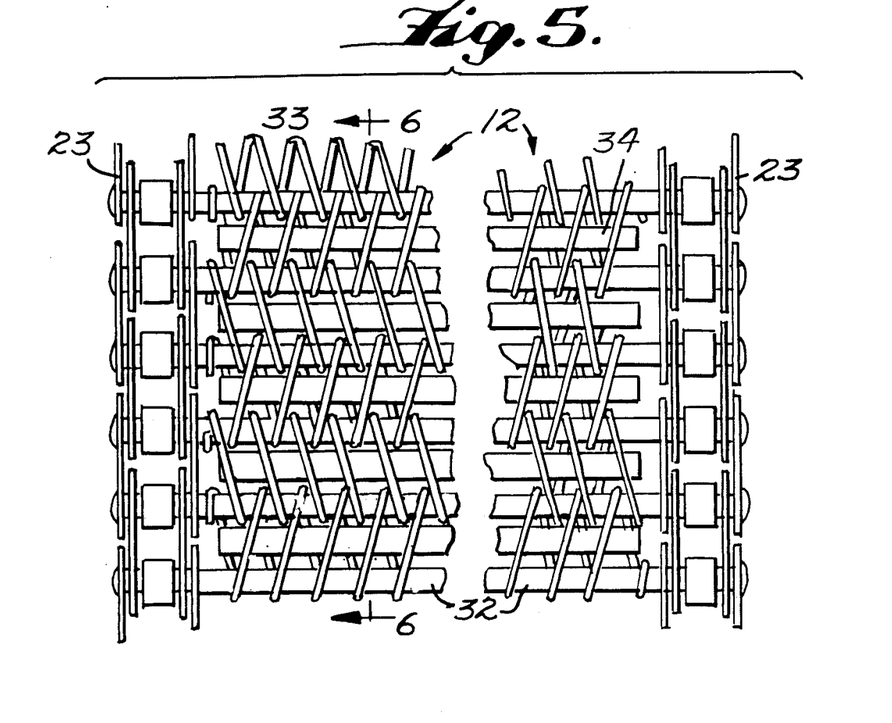
FIG. 5 is a view illustrating the construction of the conveyor belt.
Figure 6:
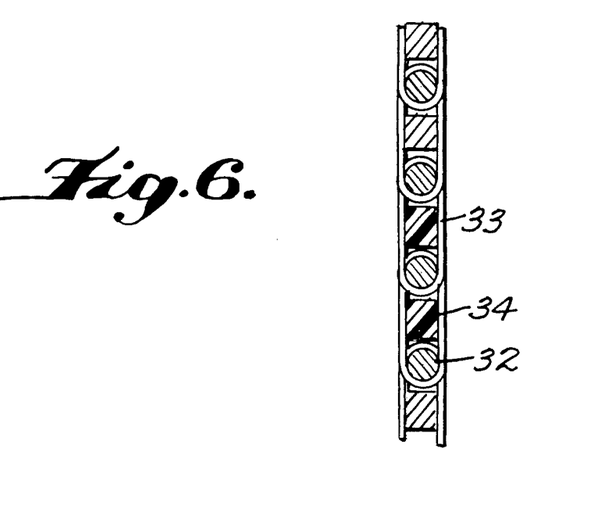
FIG. 6 is a sectional view taken along line 6—6 of FIG. 5.

FIGS. 5 and 6 show the construction of the novel conveyor belt 12 of the invention. A pair of stainless steel roller chains 23 are joined in spaced, aligned relationship by means of stainless steel rods 32 which are welded or otherwise attached to the side links of the roller chain 23 in any suitable manner. A stainless steel wire 33 is woven around the rods 32 to form the basic belt structure. Although a number of weaving patterns may be employed, as shown in FIG. 5 each rod 32 is linked to its first adjacent rod by means of a flat spiral winding of one hand and to the other adjacent rod by a flat spiral winding of an opposite hand and so on from rod to rod to complete the belt. This structure results in a very strong belt which retains its strength and flexibility under the rigors of cryogenic service at −320° F. To prevent debris passing through the belt and into the bath, the open mesh formed by the wire is "filled" with an ultra high molecular weight plastic insert 34 which effectively makes the belt solid but maintains its flexibility. The insert 34 is placed between each pair of rods 32 and is arranged to be trapped within the wire spiral weave at some point during the assembly.

As explained in connection with FIGS. 1 and 2, the conveyor belt 12 is deployed in endless fashion around drive shaft 14 and idler shaft 24 at the drive end and idler shaft 28 at the load end. However, in traversing side plates 13 from the drive end to the load end the belt must change directions in order to follow the changes in shape of the side plates. In addition, the belt arrangement of this invention requires a "tight" chain system and "maintained shape" throughout its path through the freezer thus enabling the bath to be shallow.

Figure 4:
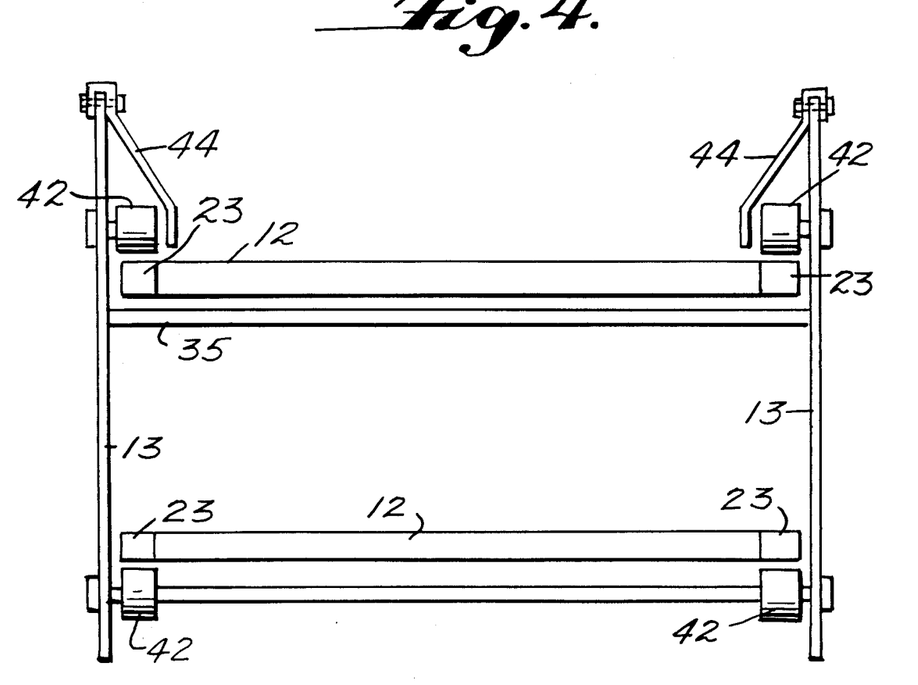
FIG. 4 is a sectional view of the conveyor belt assembly taken along the line 4—4 of FIG. 3.

The structure for maintaining the conveyor belt 12 in a "tight" relationship will be described in connection with FIGS. 3, 4 and 7. FIG. 7 is a top plan view of the cabinet with the conveyor assembly 11 shown in its lower operative position. The conveyor belt 12 has been omitted to reveal details of the supporting structure. Three support grids 35, 36 and 37 are secured to side plates 13 at a location slightly below the center line of plates 13. Grid 36 overlies the bottom portion of the vessel containing the cryogenic bath while grid 35 overlies the left sloping portion and grid 37 overlies the right sloping portion. The function of the grids 35, 36 and 37 is to prevent the conveyor belt from sagging under a heavy product load. Under normal conditions the top pass of the conveyor belt will glide along the grids with minimum friction. This action can best be seen when viewing the conveyor assembly 11 in its raised position in FIG. 3. The endless conveyor belt 12 is schematically shown as a single line with spaced arrows designating the path of movement. Note how the line is directed across the top of grids 35, 36 and 37.

Shafts 38 carrying plastic hold down rollers 39 are secured to side plates 13 at a location between the ends of grid 36 and grids 35 and 37. The shafts 38 and rollers 39 are mounted topside of conveyor belt 12 and are for the purpose of restraining the conveyor belt in its transition from one grid to another. A shaft 40 having rollers 41 is mounted between plates 13 at a location near the remote end of grid 35. The shaft and rollers are mounted so as to be on the underside of the upper conveyor pass and they serve the purpose of guiding the conveyor belt off idler shaft 28 onto grid 35. A similar shaft 40' having rollers 41' is mounted off the remote end of grid 37 to guide the conveyor belt on the idler shaft 24. The lower pass of the conveyor belt is restrained in its path of travel by a series of restraining rollers 42. These rollers are made of plastic and rotate around a metal shaft which is secured to the side plates 13. The rollers 42 extend across the roller chain and are mounted as needed. FIG. 4 shows a pair of rollers 42 serving in a supporting function on the lower pass of the conveyor belt. FIG. 3 shows rollers 42 serving in a supporting as well as hold down mode. Rollers 42 are also used on the upper pass of conveyor belt 12 for belt stability. In this position the rollers 42 are mounted on stub shafts secured to side plates 13. A pair of stub shaft supported rollers 42 is shown in FIG. 4. These rollers are shielded by product guide rails 44.

To complete the belt guiding and restraining structure, rollers 43 are mounted on idler shafts 24 and 28 and drive shaft 14 to support the medial section of the belt as it sharply turns around the shafts at the drive and load ends.

Product guide rails 44 (FIGS. 3, 4 and 8) are bolted to the side plates 13 to follow the profile of the plates. The guide rails 44 extend inwardly for a short distance but do not contact the belt 12. The guide rails prevent debris from the product load reaching the roller chains 23. As noted above, the guide rails 44 also protect the upper support rollers 42 from product debris.

The tension of the conveyor belt can be adjusted by means of screw adjusters 45. As shown in FIG. 3, screw adjuster 45 acts against bearing 29 which is slidable in slot 46. The belt 12 can be tightened or loosened depending upon its position in slot 46. A similar adjustment is provided for the other bearing 29. Screw adjusters (not shown) are also provided for bearings 25 on idler shaft 24.

It can be seen that through the use of drive cogs, low friction rollers and belt support rails an efficient drive system is obtained which can be driven from one end only by means of a motor driven chain drive. Belt wear is reduced to a minimum because of the elimination of most metal to metal contact. The belt can be driven in the raised position for cleaning and inspection.

All the TEFLON-bronze bearings are mounted "out board" of the drive system side plates thereby reducing the possibility of contamination by product debris. The chain drives 23 for the belt conveyor are similarly protected by the product guide rails 44.

The cabinet 1 is of generally rectangular shape with clean lines. The cabinet is supported by four legs 47 and levelled by four pads 48. The top of the cabinet is closed by removable lids 49, 50 and 51 with handles 52. Lids 49 and 50 are cut out to provide an opening covered by a smaller lid 53. The opening provided by the removal of lid 53 serves as a loading port for the product to be frozen.

A pair of control panels 54 is mounted on the side of the cabinet for operator convenience. The main controls comprise an electronic belt speed control and indicator, and a liquid nitrogen level control selection switch. In addition, there are state of the process indication lamps for power, motor drive, exhaust blower, cryogen flow and low level. The control system is solid state. There are no mechanical controls subject to wear and failure. Belt speed is indicated for repeatability, and liquid nitrogen level is indicated in inches. The standard belt speed control system comprises a DC drive motor, but an optional AC drive system incorporating a frequency invertor speed control can be used.

The heat given up by the product load causes the liquid nitrogen to change state at a rate of 700 volumes of gas to one volume of liquid. It is necessary to remove the gaseous nitrogen from the cabinet at a rate that precludes nitrogen escape into the surrounding area. Nitrogen, although non-toxic, can cause injury and death by oxygen displacement. To reduce the leakage of nitrogen to the surrounding area, the cabinet must be relatively sealed and subjected to a slight negative pressure by means of a ducted exhaust system.

Figure 9:
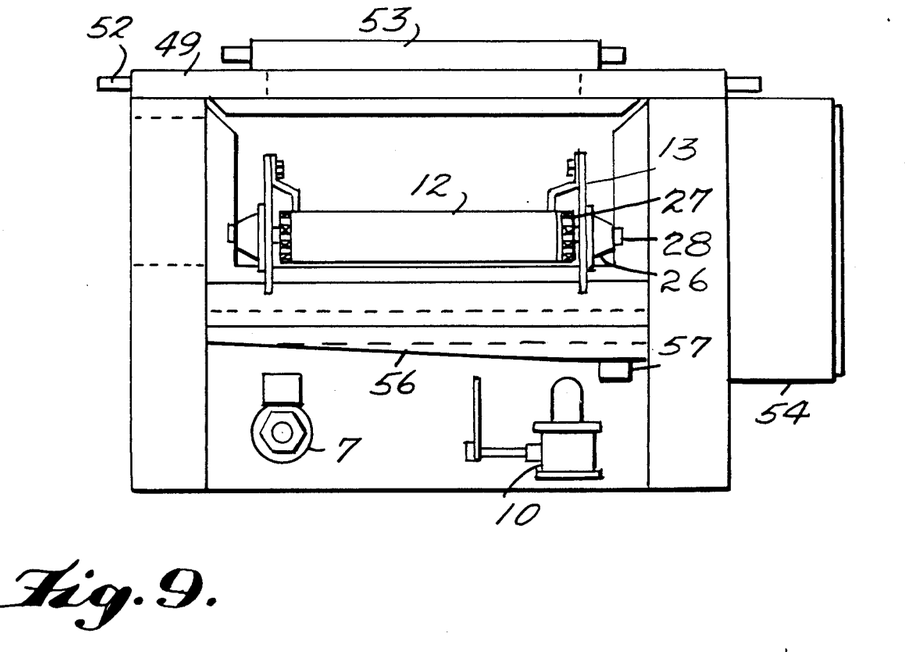
FIG. 9 is a view of the load end of the FIG. 3 with the conveyor assembly in operative position.

The load end of the cabinet is provided with a load plenum 55. A drain pan 56 having a drain outlet 57 seals the bottom of the plenum. A door 58 forms the end wall of the cabinet and seals the plenum 55 above the drain pan 56. It should be mentioned here that end door 58 can be provided with a conveyor extension to feed the belt conveyor directly as shown in FIG. 9 instead of feeding through loading opening at 53. A large exhaust port 59 is provided in plenum 55 to remove the larger volumes of nitrogen gas which are created when the warm product load first encounters the liquid nitrogen.

The drive end of the cabinet is provided with a drive plenum 60. A drain pan 61 having a drain outlet 62 seals the bottom of the plenum. A door 63 forms the end wall of the cabinet and seals the plenum 60 above the drain pan 61. The door 63 is provided with an opening at 64 to receive the frozen product. A combined scraper and shelf 65 assists in removing the frozen product from the belt and depositing it outside the cabinet. An exhaust port 66 is provided in plenum 60 to remove the nitrogen gas from the drive end of the cabinet. Exhaust port 66 is smaller than exhaust port 59 since less gas is evolved at the outlet end of the conveyor belt than at the input end.

Figure 10:
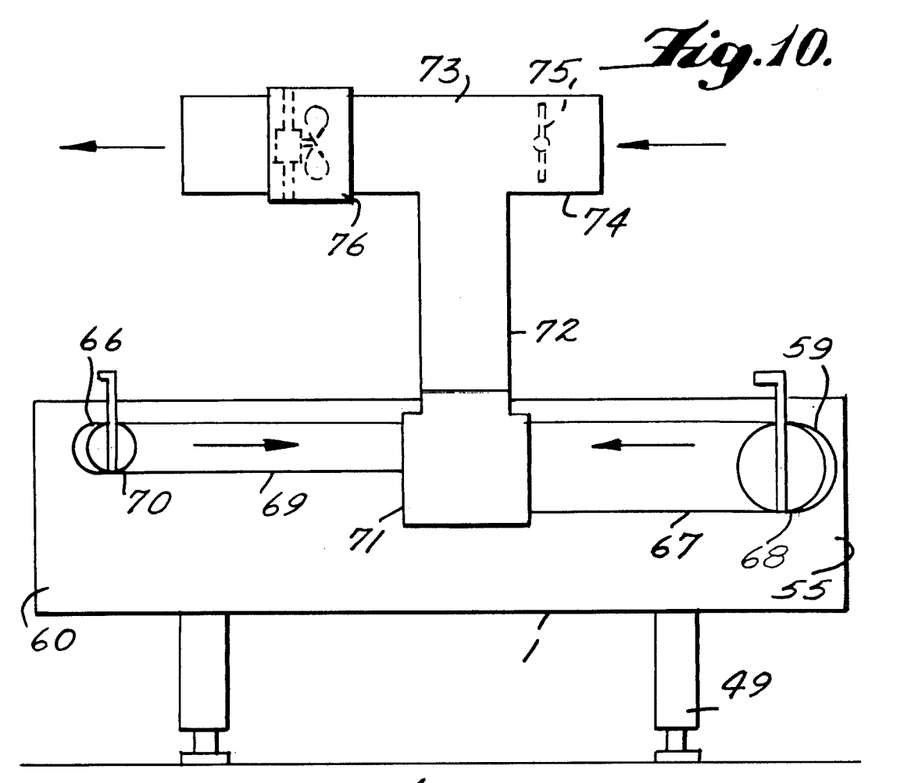
FIG. 10 is a schematic view of the gas extraction system for the invention.

FIG. 10 is a schematic view of the rear of cabinet 1 showing the exhaust system to remove the nitrogen gas evolved when the freezer is in operation. A duct 67 is coupled to outlet 59 of load plenum 55. A butterfly control damper 68 is mounted in duct 67 to control the amount of air entering the duct. A smaller duct 69 is coupled to outlet 66 of drive plenum 60. A butterfly control damper 70 is mounted in duct 69 to control the amount of air entering the duct. Ducts 67 and 69 are connected to a common collector box 71. A trunk duct 72 connects the collector box 71 with a tee 73. One branch of the tee is connected to a duct 74 which draws air from the room housing the cabinet. A control damper 75 regulates the amount of room air exhausted. An exhaust blower 76 connected to the other branch of tee 73 draws air from the duct system and exhausts it to the outside.

In operation, the blower draws the evolved nitrogen gas from outlets 59 and 66 and exhausts it to the outside. By setting dampers 68 and 70 the proper suction can be generated in the cabinet to reduce nitrogen gas leakage to a minimum. A predetermined amount of room air, as fixed by the setting of damper 75, is drawn into the exhaust system by duct 74 and mixes with the cold nitrogen coming through duct 72. Room air drawn into the exhaust system serves two purposes:

(a) It dilutes the nitrogen gas from the freezer so that frost does not build up on the exhaust fan and reduce its efficiency or cause it to fail.

(b) It ventilates the work place to ensure that any small nitrogen escape is diluted.

Although manually adjustable control dampers are disclosed it is within the purview of this invention to automate the control dampers with state of the art microprocessor controls to modulate the exhaust flow as determined by oxygen and temperature sensors.

After shutdown, the liquid nitrogen remaining in the bath must be removed prior to cleaning. The design of this novel freezer is such that very little liquid remains in the bath at the end of normal processing. Removal of this liquid is best achieved by continuing to run the belt through the freezer. Within an hour or so all the liquid will have vaporized and the freezer will be ready for cleaning. The minimum capacity bath greatly reduces operating costs by minimizing the use of liquid nitrogen.

The design of the freezer facilitates cleaning. With the covers removed, complete access to the belt is provided. Wash water is drained from the bath as required. In addition, because the belt drive and roller system are mounted from independent side plates, and only secured about the drive shaft, the whole assembly can be lifted clear of the bath from one end. This gives total access to the belt, supports, rollers and the bath to ensure complete cleaning of the freezer. With this design it is possible to "see" that the freezer is completely clean, without the necessity of removing the entire belt every time the freezer requires cleaning down. The lifting screw jack 30 is supplemented with a conveyor lifting bracket 77 for manually raising the conveyor assembly. The conveyor assembly can be mechanically blocked in the raised position by a blocking rod.

If the process demands, the belt can be fitted with clean out flights. These are designed to remove the debris build up in the bath continuously as the belt travels through the freezer. The debris collects in a tray under the exhaust hood and may be emptied manually from time to time. This feature greatly reduces the clean down procedure and ensures trouble-free freezer operation over extended periods.

It is not intended to limit the present invention to the details of illustration or terms of description of the single preferred embodiment shown above. It will be appreciated by those skilled in the art that various modifications and alterations therein may be made within the scope of the present invention.

What is claimed is:

1. A cryogenic freezer comprising a thermally insulated cabinet interiorly shaped to provide a vessel having a bottom and at least two sloping sides, a cryogenic bath maintained at a predetermined level in said vessel, a conveyor assembly having first and second end support sections and a medial section having a bottom section and at least two sloping side sections matching the profile of said bottom and at least two sloping sides of said vessel, said conveyor assembly being supported with said medial section immersed in said bath, said first support end section of said conveyor assembly being pivotally mounted in said cabinet, and power means to rotate said conveyor assembly around said pivotally mounted end section to raise said medial section above said bath level.

2. The apparatus as claimed in claim 1 wherein said power means comprises an extensible jack acting between said cabinet and said second end support section.

3. The apparatus as claimed in claim 1 wherein said cabinet is of stainless steel, double wall construction with expanded polyurethane foam insulation hermetically sealed therein.

4. A cryogenic freezer comprising a thermally insulated cabinet interiorly shaped to provide a vessel having a bottom and at least two sloping sides, a cryogenic bath maintained at a predetermined level in said vessel, a conveyor assembly having first and second end support sections and a medial section having a bottom section and at least two sloping side sections matching the profile of said bottom and at least two sloping sides of said vessel, said conveyor assembly being supported with said medial section immersed in said bath, and said first support end section of said conveyor assembly being pivotally mounted in said cabinet wherein said pivoted mounting comprises a drive shaft rotatably supported at end portions by means of bearings secured to said cabinet.

5. The apparatus as claimed in claim 4 wherein said conveyor assembly sections comprise two side plates, means for securing said side plates in spaced aligned relationship, a bearing secured to the outer side of each first end section side plate, said side plate bearings rotatably mounting said side plates on said drive shaft.

6. The apparatus as claimed in claim 5 including a first idler shaft rotatably mounted on said first end section side plates above said drive shaft by means of a pair of bearings mounted on outer portions of said first end section side plates and a second idler shaft rotatably mounted on said second end section side plates by means of a pair of bearings mounted on outer portions of said second end section side plates.

7. The appartus as claimed in claim 6 including an endless conveyor belt mounted on said conveyor assembly between said side plates, said conveyor belt having end mounted roller chains, means for driving said conveyor belt, said driving means comprising a main drive sprocket secured to said drive shaft and coupled to an external drive motor, a first pair of sprockets secured to said drive shaft, a second pair of sprockets secured to said first idler shaft, a third pair of sprockets secured to said second idler shaft, said first, second and third pairs of sprockets engaging said end mounted roller chains whereby rotation of the main drive sprocket causes motion of the conveyor belt along the conveyor belt assembly.

8. The apparatus as claimed in claim 6 wherein said conveyor belt comprises a series of rods secured to said end mounted roller chains joining said chains for movement in unison, an elongated plastic bar inserted between the rods, and a wire mesh woven around the rods and bars whereby belt flexibility is maintained with minimum openings to prevent leakage.

9. The apparatus as claimed in claim 6 including tension adjusting screws acting on said first and second idler shafts to maintain said endless belt under a predetermined tension.

10. The apparatus as claimed in claim 9 wherein support rollers are provided for upper and lower passes of said endless conveyor belt at locations between said sections to maintain said belt in a tensioned, slack-free relationship.

11. The apparatus as claimed in claim 9 including support grids secured to said side plates at said bottom and two sloping side sections at locations to support the underside of the top pass of said endless conveyor belt.

12. The apparatus as claimed in claim 6 wherein said bearings are self-aligning and comprise a TEFLON-bronze composite mounted in a stainless steel housing.

13. The apparatus as claimed in claim 4 wherein said conveyor assembly includes an endless moving conveyor belt comprising a conveyor belt construction having a pair of rods secured to side links of said roller chains joining said chains for movement in unison, an elongated plastic bar inserted between the rods, and a wire mesh woven around the rods and bars whereby belt flexibility is maintained with minimum openings to prevent leakage of product load debris.

14. The apparatus as claimed in claim 13 wherein said wire mesh comprises a wire linking a rod to an adjacent rod by means of a flat spiral winding of one hand and to the other adjacent rod by a flat spiral winding of an opposite hand and so on from rod to rod to complete the belt.

15. A cryogenic freezer comprising a thermally insulated cabinet interiorly shaped to provide a vessel for containing a bath of cryogenic fluid at a predetermined level, a conveyor assembly comprising a pair of side plates with drive and support rollers mounted thereon for supporting an endless moving conveyor belt in a mechanically tensioned manner, said conveyor assembly mounted in said cabinet so that a major portion of said conveyor belt moves through the bath to freeze a product load, power operated means to move said conveyor assembly into and out of said bath, said cabinet having top covers to prevent leakage of evolved cryogenic gas, and a plenum at each end of the cabinet to collect the evolved gas.

16. The apparatus as claimed in claim 15 wherein each plenum is connected to an exhaust duct, each duct being provided with an adjustable damper to control the rate of exhaust, said ducts being connected to a common collector, an exhaust blower connected to the collector to discharge the evolved gas to the atmosphere, and a room air intake duct with an adjustable damper mounted therein connected to said exhaust blower to bleed a predetermined amount of room air into the exhaust blower.

17. The apparatus as claimed in claim 15 wherein a drain pan is mounted in each plenum defining the bottom of the plenum.

18. The apparatus as claimed in claim 15 including a control panel mounted on the side of the cabinet, said panel housing all operating controls and function indicators in an accessible manner.

* * * * *